US005374979A

United States Patent [19]

Kobayashi

[11] Patent Number: 5,374,979

[45] Date of Patent: Dec. 20, 1994

[54] IMAGE FORMING APPARATUS

[75] Inventor: Mikio Kobayashi, Kanagawa, Japan

[73] Assignee: Fuji Xerox Co., Ltd., Tokyo, Japan

[21] Appl. No.: 203,782

[22] Filed: Mar. 1, 1994

[30] Foreign Application Priority Data

Mar. 3, 1993 [JP] Japan .................................. 5-042919

[51] Int. Cl.[5] ...................... G03G 15/02; H01T 23/00; H02B 7/00

[52] U.S. Cl. .................................... 355/219; 355/221; 355/271; 361/225; 361/229; 361/230; 361/235

[58] Field of Search ................................ 355/271-274, 355/276, 219, 221; 361/225, 230, 235, 229

[56] References Cited

U.S. PATENT DOCUMENTS 4,484,812 11/1984 Takayanagi ..................... 361/235 X

FOREIGN PATENT DOCUMENTS 62-187371 8/1987 Japan .
2-136258 11/1990 Japan .
4-212186 8/1992 Japan .

*Primary Examiner*—Matthew S. Smith
*Attorney, Agent, or Firm*—Finnegan, Henderson, Farabow, Garrett & Dunner

[57] ABSTRACT

An image forming apparatus having both an image data carrying member for carrying and forwarding image data rendered into a visible image by a developer and a device requiring high voltage in the form of a unit separable from a body of the image forming apparatus, wherein, inside the separable unit are a high voltage generator for the device and an electrically conductive member, the high voltage generator being disposed within the image data carrying member, the electrically conductive member being interposed between the image data carrying member and the high voltage generator and between the device and the high voltage generator, insulating members being interposed between the electrically conductive member and the image data carrying member and between the electrically conductive member and the device, the electrically conductive member being grounded.

7 Claims, 3 Drawing Sheets

IMAGE FORMING APPARATUS

BACKGROUND OF THE INVENTION

The present invention relates to image forming apparatuses such as electrophotographic copying machines and printers. More particularly, the present invention is directed to an image forming apparatus having image data carrying members such as a photoreceptor, a transfer material carrying member, and an intermediate transfer body for carrying and forwarding image data rendered visible by a developer as well as high voltage requiring devices such as dischargers and chargers and contained in a unit that can be separated from the body of the image forming apparatus.

Conventional image forming apparatuses such as electrophotographic copying machines and printers use a transfer unit that is separable from the image forming apparatus body. Such a transfer unit contains: image data carrying members such as a photoreceptor, a transfer material carrying member, and an intermediate transfer body for carrying and forwarding image data rendered visible by a developer; devices such as a transfer corotron and adhesion corotron that require high voltage; and the like. A high voltage generating power supply for these high voltage requiring devices is usually disposed on the image forming apparatus body side and is connected to these devices through a high power cable and several junction connectors. However, this type of arrangement often requires that signal lines and the like run adjacent to the high power lines, and in this case, noise infiltrates into the signal lines from the high power lines, often causing erroneous operation.

To overcome this problem, a solution is disclosed in Japanese Patent Unexamined Publication No. 62-187371. According to this solution, a high voltage generating power supply is disposed within the transfer unit, so that the high voltage cable and junction connectors connected to the image forming apparatus body side can be eliminated to thereby prevent such noise-induced erroneous operation.

However, while there is no description in Japanese Patent Unexamined Publication No. 62-187371, it has been found out that desired current is not provided due to current leak at the high voltage line and junction connectors and that this impairs the image quality. In addition, if the transfer unit employs an endless belt, by only arranging a high voltage generating power supply inside the loop of the endless belt, a sufficient distance between the endless belt and the high voltage generating power supply cannot be provided due to the design restriction that a large thicknesswise space is not usually provided for the endless belt unlike the transfer drum. As a result, various problems are encountered.

SUMMARY OF THE INVENTION

An object of the present invention is to provide an image forming apparatus capable of overcoming the above-mentioned conventional problems.

To achieve the above object, the present invention provides an image forming apparatus having both an image data carrying member for carrying and forwarding image data rendered into a visible image by a developer and a device requiring high voltage in the form of a unit separable from a body of the image forming apparatus. In such an image forming apparatus, inside the separable unit are a high voltage generator for the device and an electrically conductive member. The high voltage generator is disposed within the image data carrying member, and the electrically conductive member is interposed between the image data carrying member and the high voltage generator and between the device and the high voltage generator. Insulating members are interposed between the electrically conductive member and the image data carrying member and between the electrically conductive member and the device. The electrically conductive member is grounded.

According to the present invention, a high voltage generator is disposed within a separable unit, and an electrically conductive member, which is interposed between insulating members and the ground, is disposed between the image data carrying members and the high voltage generator as well as between the devices requiring high voltage and the high voltage generator. As a result of the above construction, these components are insulated electrically from one another, thereby preventing not only noise in signal lines but also current leak. Hence, impairment in image quality can also be prevented.

DETAILED DESCRIPTION OF THE PREFERRED EMBODIMENTS

An embodiment of the present invention will be described in detail with reference to the appended drawings.

Figure 1:
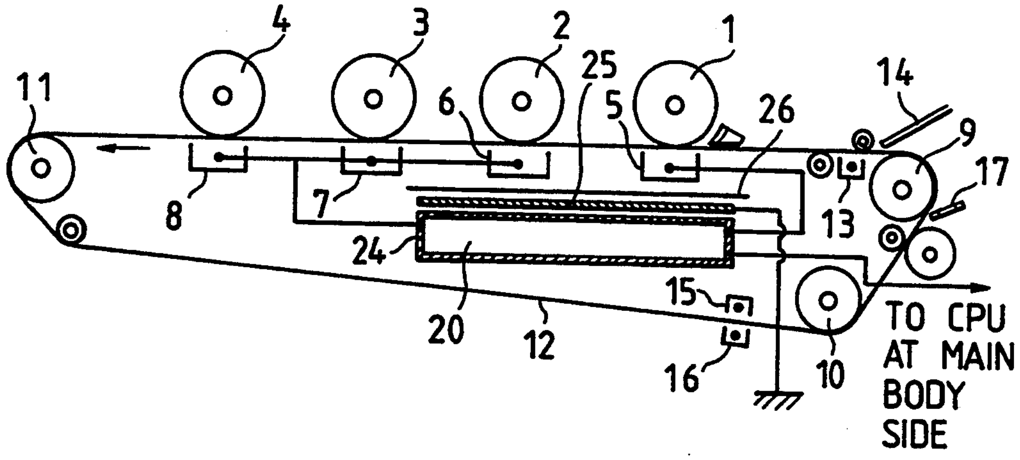
FIG. 1 is a schematic diagram showing a transfer unit of a multicolor electrophotographic copying machine of an image forming apparatus, which is an embodiment of the present invention.

FIG. 1 is a schematic diagram showing a transfer unit of a multicolor electrophotographic copying machine of an image forming apparatus, which is an embodiment of the present invention. Generally, if a multicolor electrophotographic copying machine is supposed to be an apparatus that arranges a plurality of image forming devices, separates the color of image data into black, yellow, magenta, and cyan at, for example, the respective image forming devices and renders the separated images into visible images by toners of respectively corresponding colors, then the multicolor electrophotographic copying machine can obtain a full-color image by sequentially transferring the visible images on a recording sheet. A dielectric belt is installed to the transfer unit to allow toner particles to electrostatically adhere to a transfer material with a transfer device from the back surface of the belt, the transfer material being caused to electrostatically adhere to the belt by an adhesion device. The transfer material to which the transferring operation has been repeated for the respective colors is separated from the belt by the operation of a separator roll that forces to separate the transfer material taking advantage of the rigidity of the transfer material and by the operation of a transfer device discharger for reducing an electrostatic adhesion.

Inside the belt are an adhesion charger, a plurality of transfer chargers, and, in some cases, a charger for separation and discharge of the belt. These components require not only individually dedicated power supply units or a commonly used high-voltage power supply unit, but also signal lines for informing the high-voltage power supply unit or units of the operation timing of the copying machine body as well as power cables for driving the power supply unit or units.

Now, referring to FIG. 1, image carrying bodies 1, 2, 3, and 4 are juxtaposed in the multicolor electrophotographic copying machine. These image carrying bodies are such as photoreceptor drums that are rotatably supported by rotatable shafts so as to correspond to the colors such as black, yellow, magenta, and cyan, respectively, as described above. Although not shown, various types of image forming means are arranged on the outer circumference of each image carrying body in a known manner. These means may be selected arbitrarily. Arranged in this embodiment are: a primary charger for charging the surface of each of the photoreceptor drums 1, 2, 3 and 4 uniformly to, e.g., −500 to 800 V; an exposing means such as a laser beam exposing device, for forming an electrostatic latent image on each photoreceptor drum by irradiating thereto a color-separated optical image or an equivalent thereof; a developing device for making the electrostatic latent image formed on each of the photoreceptor drums 1, 2, 3, and 4 into a visible image; and the like.

Figure 2:
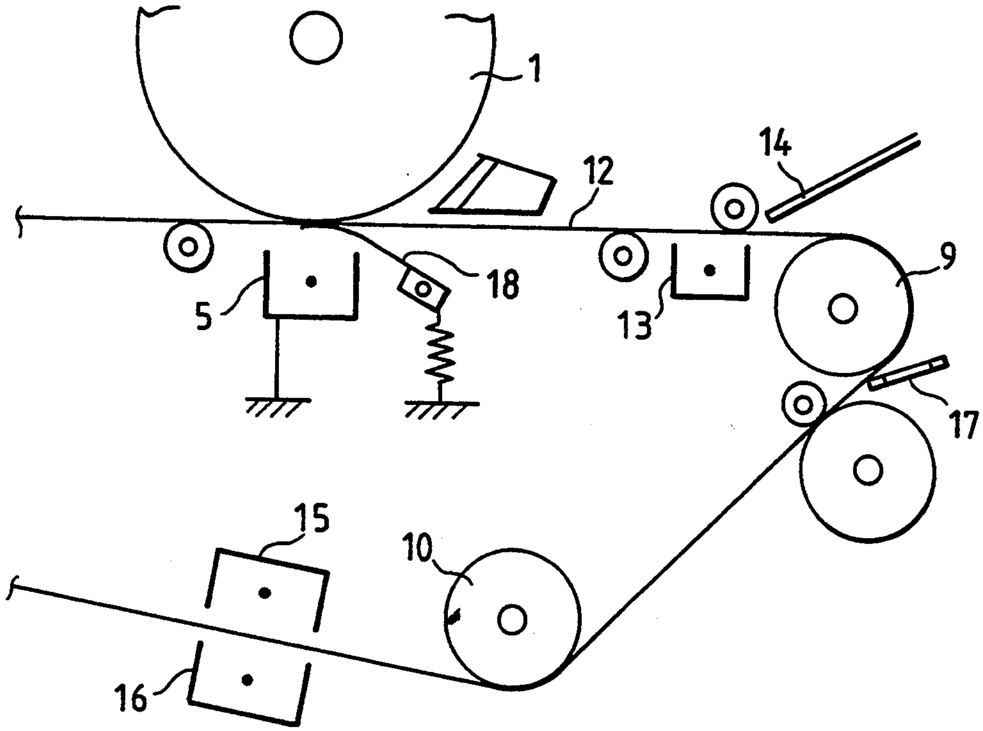
FIG. 2 is an enlarged view of the part shown in FIG. 1 for a better understanding of the arrangement of the embodiment shown in FIG. 1.

The transfer unit arranged for each of the photoreceptor drums 1, 2, 3, and 4 is removable from the copying machine body as a separate unit, and has a transfer belt 12, which is a transfer material carrying member, or an image data carrying member that is moved in the direction of the arrow by a drive shaft 9 and shafts 10 and 11 driven by such drive shaft 9. Within a space enclosed by the transfer belt 12 are transfer chargers 5, 6, 7 and 8 so as to confront the respective photoreceptor drums. Further, within such space is a charger 13 for causing the transfer material such as a recording sheet to adhere to the transfer belt 12, the recording sheet being fed from a sheet feeder (not shown) through a guide member 14. Still further, inside and outside the transfer belt 12 are: a charger 15 for discharging the inside of the transfer belt, a charger 16 for discharging the outside of the transfer belt, and a charger (not shown) for discharging the outside of the transfer belt to separate the transfer material, which constitute discharge means, and a transfer belt cleaning means 17. FIG. 2 is an enlarged view of FIG. 1 to help better understanding of the arrangement of these components. In FIG. 2, reference numeral 18 designates a pushing member called "baffle" for pushing up the transfer belt 12.

As the transfer belt 12, a member formed by integrating a dielectric transfer material carrying sheet with a forward sheet, or an equivalent thereof may be used. For example, a dielectric forward sheet using a polyethylene terephthalate (PET) or polyvinylidene fluoride resin film may be used. In this embodiment, a polyethylene terephthalate film whose thickness ranges from 50 to 200 μm and whose volume resistivity ranges $10^{18}$ to $10^{20}$ Ω.cm, is used. The diameter of each of the photoreceptor drums 1, 2, 3 and 4 is, e.g., 84 mm; the length of the transfer belt 12 is 1920 mm; and the inter-shaft distance between the photoreceptor drums, i.e., the distance between the respective transfer points is 196 mm.

The transfer chargers 5, 6, 7 and 8 are corona chargers, to which different voltages are applied. For example, voltages ranging from +4.2 to +12.0 kV are applied. The transfer current ranges from +50 to +2000 μA. In the thus constructed electrophotographic copying machine, visible images (toner images) formed on the photoreceptor drums 1, 2, 3 and 4 are transferred onto a transfer material such as a recording sheet by the operation of the transfer chargers 5, 6, 7 and 8, the transfer material being forwarded on the transfer belt 12. The separator means (not shown) for separating from the transfer belt 12 the transfer material on which the toner images have been transferred includes: a corona charger for reducing an electrostatic adhesion and separating claws made of an insulating member such as resin. The separating charger is an ac charger to which dc bias at the time of a.c. oscillation can be applied.

Figure 3:
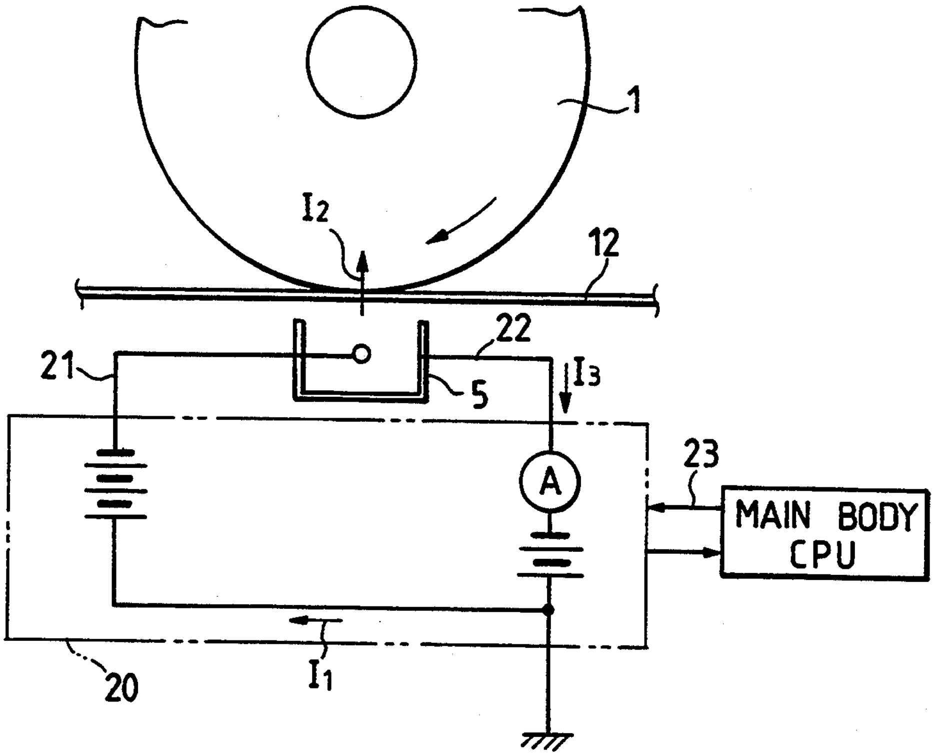
FIG. 3 is a schematic diagram showing a positional relationship between a charger and a high voltage generator disposed inside a photoreceptor and an endless belt of FIG. 1.

As schematically shown in FIG. 1, according to the present invention, inside the transfer unit is a high voltage generator 20 that applies a high voltage to the respective chargers, which are devices requiring high voltage. How these chargers and the high voltage generator 20 are arranged will be described in detail with reference to FIG. 3. FIG. 3 is a partially enlarged schematic diagram showing the positional relationship among one of the photoreceptor drums shown in FIG. 1, e.g., the photoreceptor drum 1, the transfer charger 5 confronting the photoreceptor drum 1, and the high voltage generator 20. As shown in FIG. 3 in detail, the high voltage terminal of the corotron charger 5 is connected to the high voltage side of the high voltage generator 20 through a high voltage cord 21 and a plurality of junction connectors. In the invention, a return cord 22 is connected to the transfer chargers and to the adhesion charger. That is, the return cord 22 serves to return to the high voltage generator 20 current flowing into a shield in order to control current flowing to the transfer belt 12. Here, assuming that the total current flowing into the corotron charger 5 is $I_1$, and the return current is $I_3$, then the effective transfer current $I_2$ becomes equal to $(I_1 - I_3)$. Further, each corotron charger is designed so that bias can be applied to prevent leak to the shield at the time of increasing the voltage applied to the corotron charger, taking into consideration for possible use of a high-resistance transfer sheet such as an OHP sheet. Moreover, the high voltage generator 20 is designed to be controlled through a CPU of the copying machine body and a communication cord 23.

Figure 4:
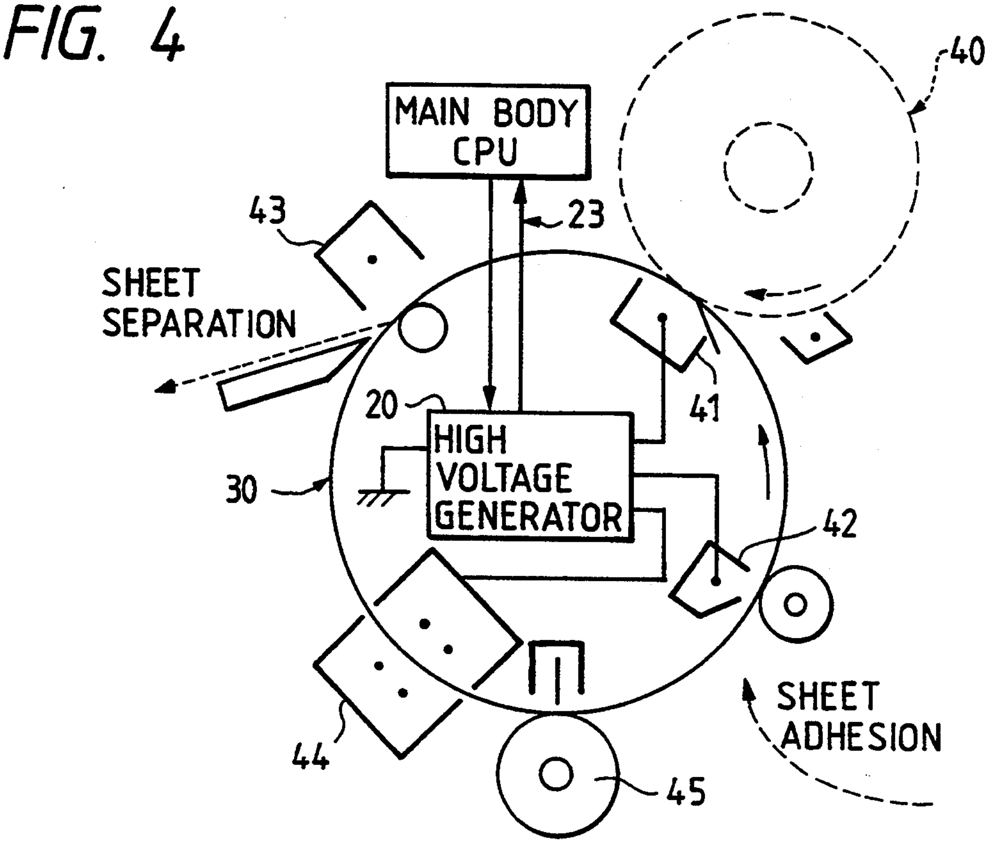
FIG. 4 is a diagram schematically showing a configuration when the high voltage generator is arranged within a transfer drum.

FIG. 4 schematically shows a configuration in case of arranging the high voltage generator 20 within a transfer drum 30. A photoreceptor 40 confronts a transfer position of the transfer drum 30, and a transfer corotron 41 is disposed within the transfer drum 30 so as to confront the photoreceptor 40. An adhesion corotron 42 is disposed at a sheet (or transfer material) feed position within the transfer drum 30. Further, a separating corotron 43 for separating the sheet from the drum sheet of the transfer drum 30, a discharge corotron 44 for discharging the inside and outside of the transfer drum, and a cleaner 45 are disposed close to the inner and outer circumferences of the transfer drum 30. In a transfer unit having the thus constructed transfer drum 30, also, the high voltage generator 20 is disposed within the transfer unit, with the high voltage side of the high voltage generator 20 being connected to the transfer corotron 41, the adhesion corotron 42, the discharge corotron 44, and the like, that are devices requiring high voltage. The high voltage generator 20 is designed to be controlled through the CPU of the copying machine body and the communication cord 23.

If the high voltage generator 20 is disposed within the transfer drum 30 as exemplified by FIG. 4, the high voltage generator 20 may be located sufficiently distant from the drum sheet on the outer circumference of the transfer drum 30, the respective corotrons 41, 42, 44 and the like as is apparent from the positional relationship shown in FIG. 4. However, if the transfer material carrying member, which is an image data carrying member, is implemented by an endless belt, there is no alternative but to arrange the high voltage generator 20 close to the endless belt 12, the corotrons 5, 6, 7, 8, 13, 15, and the like as long as the high voltage generator 20 is to be disposed within the space enclosed by the endless belt 12 as is apparent from the arrangement shown in FIG. 1.

That is, while belt-type (tandem) transfer is advantageous in achieving high productivity compared with drum-type transfer as described above, a certain widthwise dimension is required in the former to arrange a plurality of engines. Therefore, to have a small lengthwise dimension, the space enclosed by the belt becomes large in width and small in length. It is for this reason that the belt 12, the corotrons 5, 6, 7, 8 and the like are inevitably close to the high voltage generator 20 arranged inside the belt.

Figure 5:
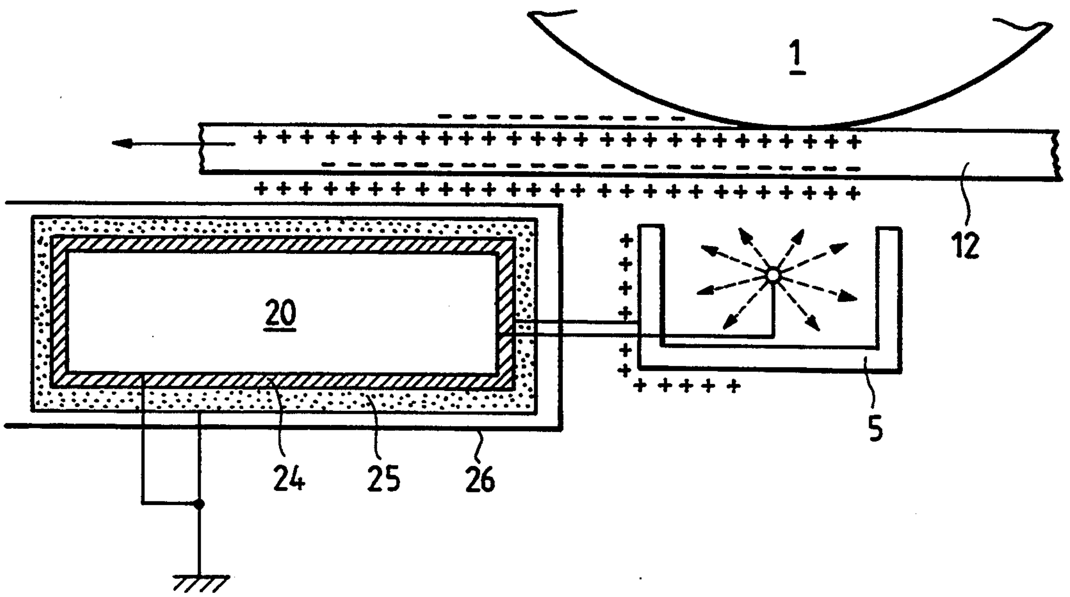
FIG. 5 is a diagram illustrative of the features of the present invention in detail.

The present inventor has found the following inconvenience when the high voltage generator is located close to the belt and the corotrons. The inconvenience and a method of removing such inconvenience will be described with reference to FIG. 5. FIG. 5 schematically shows the transfer charger 5 confronting the photoreceptor drum 1 while interposing the dielectric belt 12 therebetween at the transfer position as well as the high voltage generator 20 disposed close to the dielectric belt 12 and the transfer charger 5.

First, the dielectric belt 12 is charged to several thousand volts by repeating the processes of electrostatically imparting electric charges to and then transferring toner (developer) onto a transfer sheet that has electrostatically adhered to the belt 12 for a plurality of times. In the embodiment, it was verified that electric charges of 800 to 1000 V are stored per each of the adhesion and the transfer processes. A maximum of 3000 V is applied to the shield of each corotron charger to give the above-mentioned function. Under this condition, if no protecting means is provided to the high voltage generator 20, these components are liable to electrically and electrostatically interfere with one another, whereby disturbing the production of high quality images. Therefore, to prevent such electric and electrostatic interference, it is conceivable to interpose an electrically conductive member between the high voltage generator 20 and the dielectric belt 12 and between the high voltage generator 20 and the corotron charger 5.

In this case, while it is conceivable to ground the electrically conductive member, it was found that if an electrically conductive member is disposed close to the charged dielectric belt 12, a small leak phenomenon occurs between the belt and the grounded member, so that the image quality of the transfer material on the belt is disturbed. When toner is present at a portion at which leak occurred, the toner on that portion is dispersed into the air, thereby causing a density reduction in circular form. The diameter of a circle that is subjected to reduced density is varied depending on the distance to a position at which the leak occurred and the potential difference at the time of the leak. Under the above-mentioned condition, a defect whose diameter ranges from 2 to 20 mm is observed, attesting to the fact that such defect is fatal.

On the other hand, if the electrically conductive member is not electrically grounded, floating members cause and aggravate electric noise in many cases. Therefore, such an arrangement is not adopted to precision machines such as copying machines.

To overcome this problem, the present inventor has found the following. That is, to meet the requirement that the high voltage generator 20 be disposed close to the dielectric belt 12 and the corotron charger 5 with the high voltage generator 20 not subjected to electric and electrostatic effects from the dielectric belt 12 and the corotron charger 5 as well as with the dielectric belt 12 not subjected to electrostatic effects from the high voltage generator 20, it is desirable that: the high voltage generator 20 be covered with an insulating material 24 such as resin; then an electrically o conductive member 25 such as a sheet metal be covered thereon; the electrically conductive member 25 be grounded; and the upper surface (the side confronting the dielectric belt 12) of the electrically conductive member 25 and the lateral surface (the side confronting the corotron charger 5) of the electrically conductive member 25 be covered with an insulating member 26 such as resin. The insulating members 24 and 26 may be made of insulating resins such as acrylics and polycarbonates.

According to this embodiment, it is the insulating resin 26 that directly confronts the dielectric belt 12 and it is the insulating resin 24 that directly confronts the high voltage generator 20. Therefore, local, small leaks can be eliminated among the dielectric belt 12, the high voltage power supply 20, and both insulating resins 24 and 26. Further, the electrically conductive member 25 is grounded between both insulating resins 24 and 26. Therefore, a magnetic field passing through one of the insulating resins 24 and 26 and leaking into the other can be completely shielded.

In the image data carrying body on which an image is being formed while forwarded thereon by the dielectric belt, defective images due to locally reduced density and defective images due to reduced density on a partial area are not produced even in the case where the dielectric belt and the high voltage generator are located close to each other.

This embodiment will be further described with reference to FIG. 1. According to the present invention, the high voltage generator 20 disposed inside the endless belt is first covered with the insulating material 24. Then, the conductive member 25 is disposed between the high voltage generator 20 and the endless belt 12 and between the high voltage generator and the respective corotron chargers 5, 6, 7, 8 and 13. Further, another insulating material 26 is disposed.

In the above described embodiments, although the endless belt or transfer drum which is the transfer material carrying member, is used as the image data carrying member, the present invention is not restricted to this case. That is, the present invention can also be applied to a case where the image data carrying member is an intermediate transfer body or a photoreceptor, and the same effects can be obtained in this case.

As the image forming apparatus of the present invention has the above described structure, the stable image quality can be obtained, and it is possible to prevent defects on the image quality and noise to the signal system.

What is claimed is:

1. An image forming apparatus having both an image data carrying member for carrying and forwarding image data rendered into a visible image by a developer and a device requiring a high voltage in the form of a unit separable from a body of the image forming apparatus, wherein a high voltage generator for the device and an electrically conductive member are disposed inside the separable unit, the high voltage generator being disposed within the image data carrying member, the electrically conductive member being interposed between the image data carrying member and the high voltage generator and between the device and the high voltage generator, insulating members being interposed between the electrically conductive member and the image data carrying member and between the electrically conductive member and the device, the electrically conductive member being grounded.

2. An image forming apparatus according to claim 1, wherein the image data carrying member is a transfer material carrying member.

3. An image forming apparatus according to claim 1, wherein the image data carrying member is an intermediate transfer body.

4. An image forming apparatus according to claim 1, wherein the image data carrying member is a photoreceptor.

5. An image forming apparatus according to claim 1, 2, 3 or 4, wherein the device is a discharger.

6. An image forming apparatus for forwarding an image data carrying body to an image forming engine by a dielectric belt charged by a charger, wherein a high voltage power supply for the charger is disposed close to the dielectric belt;

the high voltage power supply is shielded by an insulating resin arranged so as to confront the dielectric belt;

the dielectric belt is shielded by an insulating resin arranged so as to confront the high voltage power supply, the insulating resin being different from the insulating resin confronting the dielectric belt; and a grounded electrically conductive member is interposed between the insulating resins.

7. An image forming apparatus for forwarding an image data carrying body along a plurality of image forming engines by an endless dielectric belt charged by a charger, wherein a high voltage power supply for the charger is disposed within a loop formed by the endless dielectric belt;

the high voltage power supply is shielded by an insulating resin arranged so as to confront the dielectric belt;

the dielectric belt is shielded by an insulating resin arranged so as to confront the high voltage power supply, the insulating resin being different from the insulating resin confronting the dielectric belt; and a grounded electrically conductive member is interposed between the insulating resins.

* * * * *